US009785027B2

(12) United States Patent
Hirata et al.

(10) Patent No.: US 9,785,027 B2
(45) Date of Patent: Oct. 10, 2017

(54) LIQUID CRYSTAL DISPLAY DEVICE

(71) Applicant: MITSUBISHI ELECTRIC CORPORATION, Tokyo (JP)

(72) Inventors: Naoya Hirata, Tokyo (JP); Takahiro Ueno, Koshi (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/352,932

(22) Filed: Nov. 16, 2016

(65) Prior Publication Data

US 2017/0146878 A1 May 25, 2017

(30) Foreign Application Priority Data

Nov. 19, 2015 (JP) ................. 2015-226256

(51) Int. Cl.
*G02F 1/1362* (2006.01)
*G02F 1/1345* (2006.01)
(Continued)

(52) U.S. Cl.
CPC ...... *G02F 1/136286* (2013.01); *G02F 1/1339* (2013.01); *G02F 1/1368* (2013.01); *G02F 1/13439* (2013.01); *G02F 1/133345* (2013.01); *G02F 1/134363* (2013.01); *G02F 1/136227* (2013.01); *G02F 2201/123* (2013.01)

(58) Field of Classification Search
CPC ...... H01L 27/1214–27/1296; G02F 1/136286; G02F 1/1345–1/13454; G02F 1/13458; G02F 1/134363; G02F 2001/13629; G02F 2001/136295; G02F 2001/134381
See application file for complete search history.

(56) References Cited

U.S. PATENT DOCUMENTS

2010/0073587 A1* 3/2010 Satoh ................. G02F 1/13452
349/40
2011/0102719 A1* 5/2011 Kakehi ............ G02F 1/134363
349/122
(Continued)

FOREIGN PATENT DOCUMENTS

CN     101201482 A  *  6/2008
JP     2007140353 A  *  6/2007
(Continued)

*Primary Examiner* — Mariceli Santiago
(74) *Attorney, Agent, or Firm* — Studebaker & Brackett PC

(57) ABSTRACT

A liquid crystal display device includes: a first substrate which includes a display region, in which scan wirings and signal wirings intersecting with scan wirings are formed, and a frame region, which surrounds the display region, wherein a lead-out wiring extending from at least one of the signal wiring and the scan wiring and a ground electrode on an insulating layer covering the lead-out wiring are formed in the frame region; a second substrate, which faces the first substrate with interposing a seal, wherein a transparent conductive film is formed on a surface opposite to a side where the liquid crystal is provided; and a conductive member, which is formed to extend across the first substrate and the second substrate to electrically connect the transparent conductive film with the ground electrode, wherein the ground electrode overlaps with at least one of the lead-out wirings.

9 Claims, 4 Drawing Sheets

(51) Int. Cl.
*G02F 1/1333* (2006.01)
*G02F 1/1368* (2006.01)
*G02F 1/1343* (2006.01)
*G02F 1/1339* (2006.01)

(56) References Cited

U.S. PATENT DOCUMENTS

| | | | |
|---|---|---|---|
| 2013/0050626 A1* | 2/2013 | Miyanaga | G02F 1/1345 349/139 |
| 2013/0088672 A1* | 4/2013 | Shin | G02F 1/133512 349/110 |
| 2014/0111724 A1 | 4/2014 | Nishino et al. | |
| 2017/0212395 A1 | 7/2017 | Hirata et al. | |

FOREIGN PATENT DOCUMENTS

| JP | 2008-145462 A | | 6/2008 |
|---|---|---|---|
| JP | 2008-145686 A | | 6/2008 |
| JP | 2011170200 A | * | 9/2011 |
| JP | 2014-085424 A | | 5/2014 |

\* cited by examiner

LIQUID CRYSTAL DISPLAY DEVICE

CROSS-REFERENCE TO RELATED APPLICATION

This application claims priority from Japanese Patent Application No. 2015-226256 filed on Nov. 19, 2015, the entire subject matter of which is incorporated herein by reference.

TECHNICAL FIELD

This disclosure relates to a liquid crystal display device.

BACKGROUND

In an electro-optical display device, specifically, a liquid crystal display device have an In Plane Switching (IPS) mode or a Fringe Field Switching (FFS) mode, a display quality thereof is deteriorated due to electric charge generated on a display surface of a display panel, and thus the electric charge needs to be removed. Therefore, for example, as a device disclosed in JP-A-2008-145462, there are many cases where a display surface of a display panel is electrically connected to electrodes provided on the TFT substrate by using a conductive tape or a conductive paste.

In a terminal region in the device disclosed in JP-A-2008-145462, an ID pad, a driver IC, a FPC, and the like need to be arranged in addition to electrodes for grounding. Therefore, as a frame thereof becomes narrow, it has become hardly to secure a region on which a pattern only used for an electrode for grounding is arranged just in order to be electrically connected to a transparent conductive film formed on an upper surface of a color filter (CF) substrate (display surface side) to avoid above-described patterns.

In order to solve a problem of restriction in design, there is provided means for electrically connecting the display surface of the display panel to other electrodes using the conductive paste, and a space can be saved. For example, this is disclosed in JP-A-2008-145686.

However, recently, since a request of making the frame of the liquid crystal display device be narrow is increased, and restriction in design of making the frame be narrow becomes strict, it is difficult to solve the problem even when using a technique disclosed in JP-A-2008-145686.

Further, in order to solve the problem of restriction in design, there is a technique of removing the electric charge using an inspection pad as an electrode, and therefore, making the frame be narrow can be achieved. Such a technique is disclosed, for example, in JP-A-2014-085424.

SUMMARY

However, in JP-A-2014-085424, since the inspection pad is used as the ground electrode and the panel is connected to a panel display unit via a switching element is arranged therebetween, in a case where a electric charge is intruded into a CF, a conductive paste, a conductive tape or the like due to static electricity and the like, the charge can be intruded into the display region through the signal wirings, and then the intruded charge can cause a breaking of TFT elements of display pixels or disconnection of the signal wirings.

This disclosure is to provide a display device capable of making a frame be narrow without degrading a tolerance with respect to static electricity of the liquid crystal display device.

A liquid crystal display device according to this disclosure includes: a first substrate which includes a display region, in which scan wirings and signal wirings intersecting with scan wirings are formed, and a frame region, which surrounds the display region, wherein a lead-out wiring extending from at least one of the signal wiring and the scan wiring and a ground electrode on an insulating layer covering the lead-out wiring are formed in the frame region; a second substrate, which faces and is bonded to the first substrate with interposing a seal, wherein a transparent conductive film is formed on a surface opposite to a side where the liquid crystal is provided; and a conductive member, which is formed to extend across the first substrate and the second substrate to electrically connect the transparent conductive film with the ground electrode, wherein the ground electrode overlaps with at least one of the lead-out wirings.

The liquid crystal display device according to this disclosure achieves making the frame be narrow by providing the ground electrode to overlap the lead-out wiring of the frame region, without securing a new space where a pattern only used for an electrode for grounding is made.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Embodiment

Figure 1:
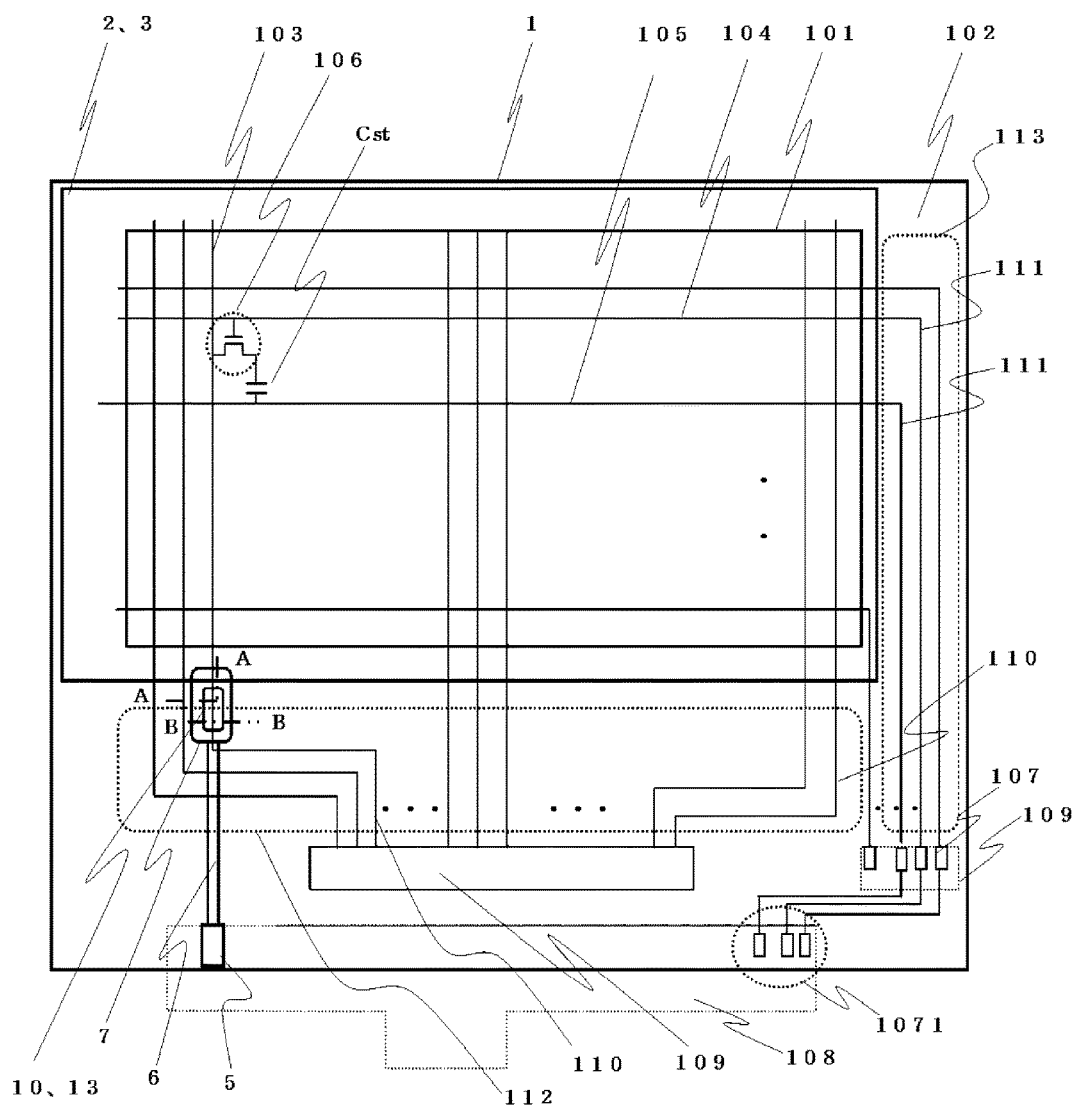
FIG. 1 is a plan view illustrating a configuration of a liquid crystal display panel of a liquid crystal display device according to a first embodiment of this disclosure.
Figure 2:
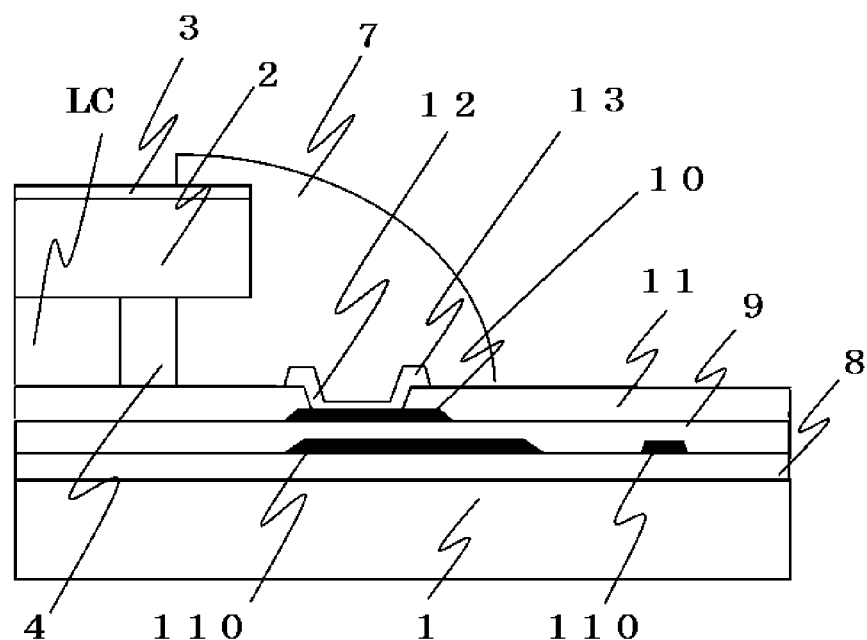
FIG. 2 is a cross-sectional view taken along a line A-A of FIG. 1.

Embodiments of this disclosure will be described hereinafter with reference to drawings. FIG. 1 is a plan view of a liquid crystal display panel of a liquid crystal display device according to an embodiment. In addition, FIG. 2 is a cross-sectional view of the liquid crystal display panel, and specifically, is a cross-sectional view of a part of A-A in FIG. 1. All of drawings are schematically illustrated, and illustrated configuration components do not means an accurate size thereof. In addition, in order to easily understand the drawings, regarding parts other than main parts of this disclosure, descriptions thereof will be appropriately omitted and a part of the configuration will be appropriately simplified.

As illustrated in FIGS. 1 and 2, a liquid crystal display panel 100 is configured by bonding a TFT substrate 1 being a first substrate, on which wirings and the like is formed, with a color filter (CF) substrate 2 being a second substrate facing the TFT substrate when a liquid crystal LC is sealed in a seal 4. The liquid crystal display panel 100 includes a display region 101 displaying an image, a frame region 102 which surrounds at least one side of the display region 101. The liquid crystal display device is configured by providing this liquid crystal display panel, and a driving circuit or a light source is mounted in a frame.

In the display region 101, a plurality of signal wirings 103 and a plurality of scan wirings 104 are arranged to intersect with each other. Here, a part where the signal wirings 103 and the scan wirings 104 intersects with each other is referred to as an intersecting portion. Further, a region surrounded by the adjacent signal wirings 103 and scan wirings 104 constitutes one pixel portion. Accordingly, in the display region 101, a plurality of the pixel portions are arranged in a matrix shape. In addition, as described later, one pixel portion includes at least one of a pixel electrode.

In the display region 101, a common wiring 105 parallel to the scan wirings 104 is also arranged. As described later, the common wiring 105 supplies a common potential to each pixel portion. Therefore, in each pixel portion, the pixel electrode and the common wiring are included. Electric field including a direction parallel to a surface of a base material of the TFT substrate 1 is formed between the electrode and wiring and is applied to the liquid crystal LC. That is, the liquid crystal display device according to this embodiment is mainly associated with a transverse electric field type including In Plane Switching (IPS) or FFS.

In addition, a thin film transistor 106 which is a switching element is arranged adjacent to the intersecting portion of the signal wiring 103 and the scan wiring 104, and at least one thin film transistor 106 is provided for each one pixel portion. To be described later, the thin film transistor 106 is connected to the pixel electrode or the signal wiring 103, and a capacitor Cst is formed between the pixel electrode and the common wiring 105.

Next, the frame region 102 will be described. In the frame region 102, a plurality of mounting terminals 107, and a plurality of external connection terminals 1071 respectively connected to the plurality of mounting terminal 107 are arranged. To the plurality of mounting terminals 107, a plurality of lead-out wirings 110 extending from the signal wirings 103 in the display region 101 and plurality of lead-out wirings 111 extending from the scan wirings 104 in the display region 101 are respectively connected. Incidentally, the term "extending" means functions as the wiring, and for example, meaning of extending includes meaning of forming the signal wirings 103 and the lead-out wiring 110 as one pattern, and also includes meaning of separately forming each of them and then electrically connecting to each other. Further, a region where the plurality of lead-out wirings 110 are formed is refer to as a lead-out wiring region 112 and a region where the plurality of lead-out wirings 111 are formed is refer to as a lead-out wiring region 113, and these regions are surrounded by a dotted line.

A integrated circuit (IC) chip 109 for signal-controlling is connected to the mounting terminal 107, and a wiring substrate 108 such as a flexible printed circuit (FPC) is connected to the external connection terminal 1071. Also, since FIG. 1 is illustrating the liquid crystal display panel 100, the IC chip 109 being mounted after the liquid crystal display panel 100 is formed or the wiring substrate 108 connected to the liquid crystal display panel 100 are illustrated by a dotted line.

Figure 3:
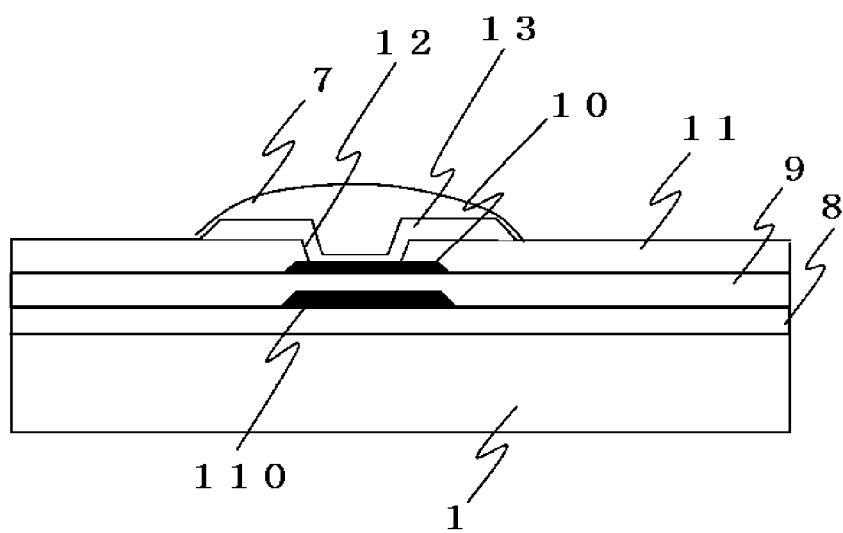
FIG. 3 is a cross-sectional view taken along a line B-B of FIG. 1.

Next, a structure of the liquid crystal display panel 100 will be described. As described above, the liquid crystal display panel is provided with the TFT substrate 1, the CF substrate 2, the liquid crystal LC, and the seal 4, and the wirings, electrodes, terminals, switching elements and the like are formed on the TFT substrate 1. Also, the liquid crystal display panel is further provided with a transparent conductive layer 3 which is formed on a surface of the CF substrate 2, an FPC connecting electrode 5 which is a connection electrode for grounding, formed on the frame region 102 on the TFT substrate 1, and a conductive bus 6. The FPC connecting electrode 5 is connected to the wiring substrate 108. Further, the conductive paste 7, which is a conductive member formed to extend across the TFT substrate 1 and the CF substrate 2 is also provided. Hereinafter, these components will be described sequentially with reference to FIG. 1 to FIG. 3. Also, FIG. 3 is a cross-sectional view of the liquid crystal display panel, and specifically, is a cross-sectional view of a part of a line B-B in FIG. 1.

A base material of the TFT substrate 1 or the CF substrate 2 is an insulating member made mainly of such as glass, plastic, or film type resin. The FPC connecting electrode 5 and the conductive bus 6 are formed in a thin film shape by using a conductive material, such as metal, on a surface of the TFT substrate 1 of which the base material is an insulating material. The transparent conductive layer 3 is formed as a transparent conductive film, such as indium tin oxide (ITO) or indium zinc oxide (IZO), on a surface of the CF substrate 2 of which the base material is an insulating material. Also, in FIG. 2, the transparent conductive layer 3 is formed on a surface opposite to a side of the liquid crystal LC among both surfaces of the CF substrate 2.

The signal wirings 103 and the lead-out wiring 110 extending from the signal wirings 103 are formed on a first insulating layer 8 formed on a base material of the TFT substrate 1. A ground electrode 10 is provided on the second insulating layer 9 covering the lead-out wiring 110. The ground electrode 10 is formed to overlap with at least one of the lead-out wirings 110 with intereposing an insulating layer, and is electrically insulated from the overlapped lead-out wiring. In addition, the ground electrode 10 is formed to be electrically connected to the FPC connecting electrode 5 through the conductive bus 6. Here, the conductive bus 6 may be formed at the same time of forming the ground electrode 10 or the FPC connecting electrode 5, or may be formed to be one pattern integral with the ground electrode 10 or the FPC connecting electrode 5. If patterns thereof are formed of a metal film, an electrical resistance thereof can be reduced.

An opening portion 12 is provided on a third insulating layer 11 on the ground electrode 10, and a conducting layer 13 is provided on the third insulating layer 11 to cover the opening portion 12, and to be in contact with the ground electrode 10 directly. Also, a material of the conducting layer 13 may be a metal, but the transparent conductive film such as ITO or IZO may be used, in views of electrical connection with the conductive paste 7.

The conductive paste 7, which is a conductive member for connection, is arranged on the conducting layer 13 and the third insulating layer 11. The conductive paste 7 is further applied to a side surface of an end portion of the CF substrate 2 and is arranged to cover a part of the transparent conductive film 3 on the CF substrate 2. That is, the transparent conductive film 3 on the CF substrate 2 is connected to the conducting layer 13 through the conductive paste 7, and is also electrically connected to the ground electrode 10. Furthermore, in other words, the conductive paste 7 is formed so that the transparent conductive film 3 and the ground electrode 10 are electrically connected to each other, and the paste is formed to extend across the TFT substrate 1 and the CF substrate 2.

Further, as described above, the ground electrode 10 is electrically connected to the FPC connecting electrode 5 through the conductive bus 6. When the wiring substrate 108 such as the FPC is mounted on the FPC connecting electrode 5 and then a ground potential is supplied to the FPC connecting electrode 5 from the FPC, a surface of the CF substrate 2 is grounded through an electric passage in order of the transparent conductive film 3, the conducting layer 13, the ground electrode 10, and the FPC connecting electrode 5. Specifically, if the conductive bus 6, the ground electrode 10, and the FPC connecting electrode S are formed of a metal film, and the conducting layer 13 is formed of the transparent conductive film, an electrical resistance of the passage can be reduced.

Here, although electric charge is charged to a surface of the CF substrate 2, the electric charge is discharged through the electric passage. Accordingly, an effect where the display quality is prevented from being deteriorated due to charging is achieved. In addition, since the ground electrode 10 is a pattern totally independent from an in of the display region 101, even in a case where static electricity is inserted to a surface of the CF substrate 2 or the conductive paste 7, the static electricity is not inserted into a display surface, and static electricity tolerance is not reduced.

In the embodiment, in the related art, the ground electrode is provided a the lead-out wiring arranged on the frame region, and an area for providing thus new ground electrode does not need to be secured, and a frame of the liquid crystal display device can be made be narrow.

In addition, as described in FIG. 3, the conducting layer 13 may be formed in a shape of size protruded from the outline of a plan view of the lead-out wiring 110 or the ground electrode 10. In this case, since the conductive paste 7 is arranged to cover the conducting layer 13, the conductive paste 7 has a large size of a shape which protrudes from a planar contour the conducting layer 13. Accordingly, since an application state of the conductive paste 7 can be checked from a rear side of the TFT substrate 1 (opposite to liquid crystal LC), a defective product can be eliminated even when a failure of application occurs, an effect of securing a quality is achieved.

As illustrated in FIGS. 2 and 3, since when the conductive paste 7 covers entirely the conducting layer 13, the conducting layer 13 is blocked from the external environment, reliability with respect to corrosion resistance is improved.

In FIG. 1 to FIG. 3, the conductive paste 7 is used. However, a conductive material such as a conductive tape may be used instead of the conductive paste 7.

In FIG. 1, one ground electrode is arranged. However, a plurality of the ground electrodes may be provided using a plurality of metal film wirings, while achieving the frame be narrow, a redundancy of the ground electrode can be secured.

In addition, in the embodiment, the ground electrode 10 is formed above the lead-out wiring 110 continue into the signal wirings 103, but the ground electrode 10 may be formed above the lead-out wiring 111 continue into the scan wirings 104 and the common wiring 105. Even in this case, making the frame of the liquid crystal display device be narrow can be achieved. Also, in a case where the ground electrode is provided above the lead-out wiring 111 continue into an inverted staggered type thin film transistor, a first insulating layer does not need to be newly provided on a lower layer of the wiring. That is, in terms of achieving the effect of this disclosure, the first insulating layer as illustrated in FIG. 2 is not necessary.

The ground electrode 10 in the first embodiment achieves an effect when overlapping with at least one of the lead-out wirings 110. However, effect of saving space can be further achieved in only a case where the ground electrode 10 is provided in the lead-out wiring region 112. It is same as that of the lead-out wiring region 113.

Next, pixels in the display region 101 will be described. Here, the liquid crystal display device of the FFS mode is exemplified, but another transverse electric field types liquid crystal display device may be used.

Figure 4:
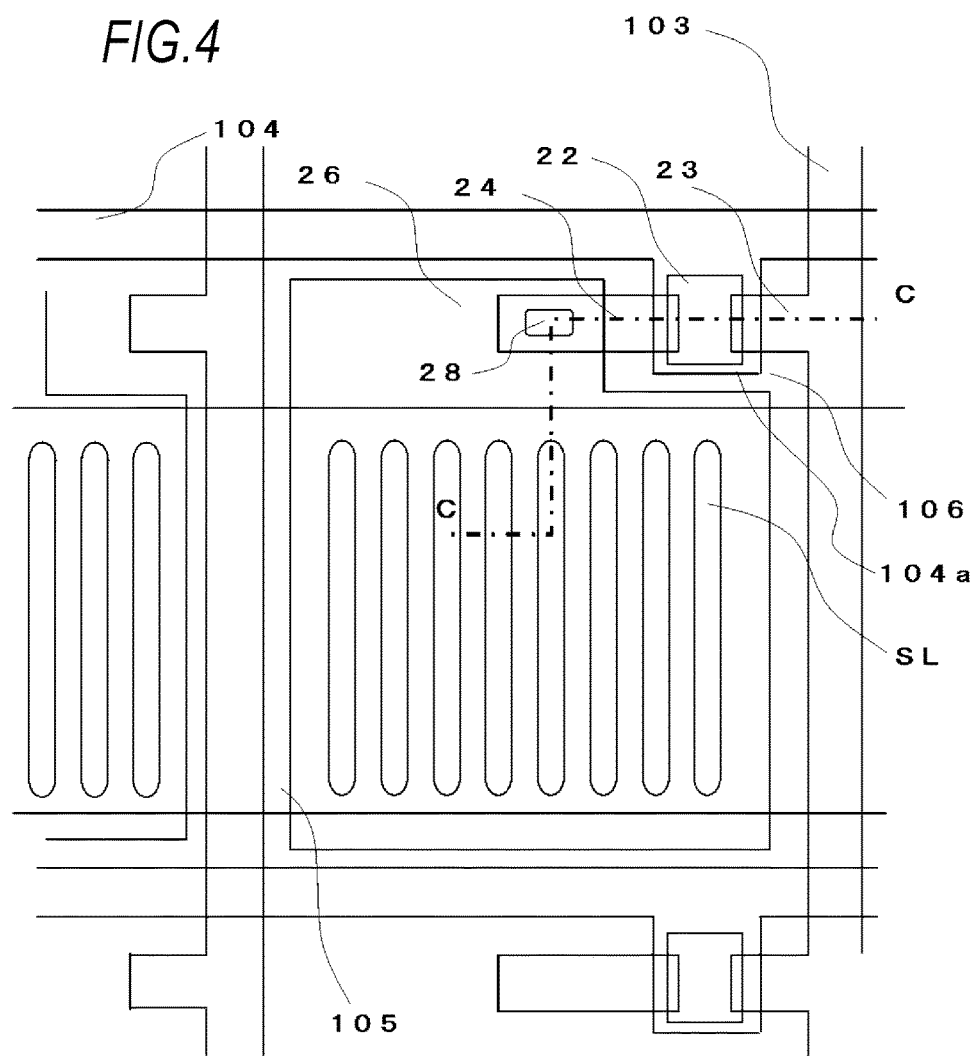
FIG. 4 is a plan view illustrating a display region of the liquid crystal display device according to the first embodiment of this disclosure.
Figure 5:
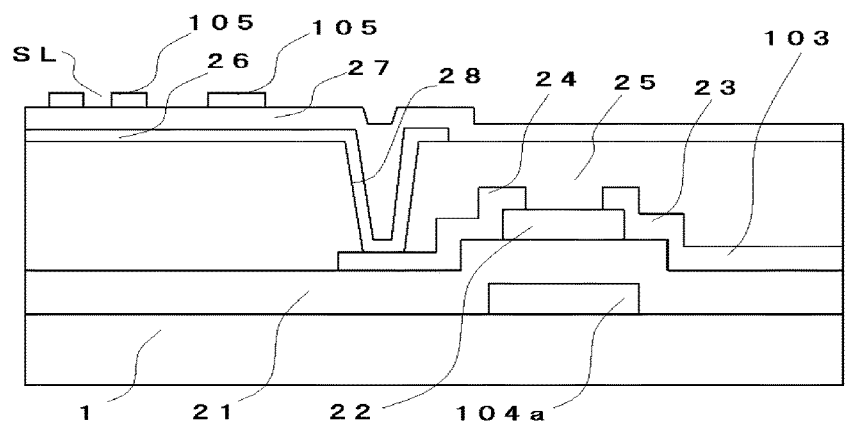
FIG. 5 is a cross-sectional view taken along a line C-C of FIG. 4.

FIG. 4 and FIG. 5 are a plan view and a cross-sectional view illustrating a vicinity of pixels in the display region 101. FIG. 5 is a cross-sectional view in a part of C-C in FIG. 4 being a plan view. A gate insulating film 21 which covers the scan wirings 104 and a gate electrode 104a extending from the scan wirings 104 is formed on the TFT substrate 1. The gate insulating film 21 corresponds to the first insulating layer 8 in FIG. 2. As a material of the gate insulating film 21, silicon oxide, silicon nitride, or the like can be used. Also, the lead-out wiring 111 continue into the scan wirings 104 may be formed at the same time of forming the scan wirings 104.

Next, a semiconductor film 22 is formed on the gate insulating film 21. In the semiconductor film 22, an amorphous silicon (a-Si) film, a polycrystalline silicon (p-Si) film, and an oxide semiconductor film such as In—Ga—Zn—O can be used. A source electrode 23 extending from the signal wirings 103 is formed on the semiconductor film 22. Accordingly, an image display signal potential can be supplied to a source region of the semiconductor film 22.

Further, a drain electrode 24 is formed on a drain region of the semiconductor film 22. The source electrode 23 and the drain electrode 24 can be formed in a process same as that of the signal wirings 103.

For example, a low-resistance metal material such as Al, Cr, or Mo can be used for the scan wirings 104 and the signal wirings 103. In addition, the scan wirings 104 and the signal wirings 103 are respectively formed on a different wiring layer. That is, the scan wirings 104 and the signal wirings 103 are arranged to be intersect with each other at substantially right angle, with interposing the gate insulating film 21. Also, in a vicinity of the intersecting portion, the TFT 106 including the gate electrode 104a connecting the scan wirings 104, the semiconductor film 22, the drain electrode 24, and the source electrode 23 are arranged. In addition, the TFT 106 is connected to the signal wirings 103 through the source electrode 23.

In the TFT which is complete as described above, when a gate signal is supplied to the scan wirings 104, a gate voltage is applied to a predetermined gate electrode 104a. Accordingly, the TFT 106 is turned on, and the image display signal potential is supplied to the drain electrode 24 through the source electrode 23 and the semiconductor film 22 from the signal wirings 103.

An interlayer insulating film 25 is formed on the TFT including the drain electrode 24. The interlayer insulating film may be a planarizing film made of resin, and may be a stacked film of an inorganic film made of SiN or SiO2 and a resin film. In comparison with FIGS. 1 to 3, in a case where the lead-out wiring 110 is arranged on a same layer as the signal wirings 103, the interlayer insulating film 25 corresponds to a second insulating layer 9 in FIG. 2.

Further, the pixel electrode 26 is formed on the interlayer insulating film 25. The pixel electrode 26 is connected to the drain electrode 24 through a first contact hole 28 provided on the interlayer insulating film 25. Therefore, the image display signal potential transmitted to the drain electrode 24 is also applied to the pixel electrode 26. That is, the TFT 106 is electrically connected to the pixel electrode 26.

In a case of a transmissive type liquid crystal display panel, the pixel electrode 26 is formed of the transparent conductive film such as ITO. In a comparison with FIGS. 1 to 3, the ground electrode 10 may be provided on the second insulating layer 9 corresponding to the interlayer insulating film 25 in the frame region 102. The ground electrode 10 may be formed of ITO same as the pixel electrode, and may be formed of new metal film.

Further, in the liquid crystal display panel of a horizontal electric field method or an FFS method, a capacitor insulating film 27 is provided on a upper layer of the pixel electrode 26, and the common wiring 105 is formed to face the pixel electrode 26 through the capacitor insulating film 27. A capacitor formed between the pixel electrode 26 and the common wiring 105 corresponds to capacitor Cst illustrated in the display region 101 in FIG. 1. Here, the capacitor insulating film 27 may correspond to the third insulating layer 11 in FIG. 2.

The common wiring 105 is formed of the transparent conductive film, and includes an opening portion SL having a slit shape. That is, the opening portion SL is a region where the common wiring 105 is not formed, and the pixel electrode 26 of a lower layer is exposed through the capacitor insulating film 27 in the opening portion SL. Here, after the opening portion 12 is formed on the third insulating layer 11, the conducting layer 13 may be formed at the same time of forming the common wiring 105. In the FFS method, common potential is supplied to the common wiring, an electric field between the pixel electrode and the common wiring is generated, specifically in slit peripheries, and liquid crystal molecules constituting a liquid crystal LC is driven by a fringe electric field to contribute to display of the liquid crystal display device.

Here, FIG. 4 is illustrated with an assumption that the common wiring 105 is formed of the transparent conductive film, but the lead-out wiring 111 (refer to FIG. 1) extending from the common wiring 105 to the frame region 102 is generally formed of a metal film, in order to reduce a wiring resistance. Therefore, the common wiring 105 and the lead-out wiring 111 are respectively formed on a different layer with interposing an insulating film, and can be configured with a structure of being electrically connected to each other through the opening portion opened in the insulating film. In this case, the lead-out wiring 111 extending from the common wiring 105 to the frame region 102 may be a metal layer of same layer as the scan wirings or the signal wirings.

In addition, generally, the common wiring 105 is formed substantially over the entire surface in the display region 101, or may be formed in every pixel portion rather than a wiring as illustrated in FIG. 4. In the liquid crystal display device of the FFS mode, since fringe electric field generated between the common potential and the pixel electrode is important, the common wiring illustrated in FIG. 4 is generally referred to as a counter electrode or a common electrode, as an expression corresponding to the pixel electrode.

Therefore, the common wiring 105 is disclosed as a band shape pattern extending in a horizontal direction across a plurality of pixels in FIG. 4, but may not be such a pattern. For example, the common wiring 105 may be formed to be a string with the entire surface of the display region 101, except the opening portion SL having the slit shape. An opening can be appropriately provided such that the opening is not provided above the TFT or the intersecting portion and the like, in addition to the opening portion SL.

In the first embodiment, the wiring on which the ground electrode 10 overlaps is the lead-out wiring 110 extending from the signal wirings 103 has been described. However, as described above, the ground electrode 10 may overlap with the lead-out wiring 111 extending from the scan wirings 104. In a case where the wiring overlapping with the ground electrode 10 with interposing the insulating film is arranged in a same layer as the lead-out wiring 111 extending from the scan wirings 104, the ground electrode 10 may be formed at the same time of the signal wirings 103. In this case, without a film corresponding to the first insulating layer 8, the second insulating layer 9 corresponds to the gate insulating film 21, and the third insulating layer 11 corresponds to at least one of the interlayer insulating film 25 and the capacitor insulating film 27.

In addition, the embodiment described above can be applied to a case where the lead-out wiring 110 is formed on a same layer as the scan wirings 104. In this case, the signal wirings 103 and the lead-out wiring 110 are arranged on a different layer though the gate insulating film 21, and both of them are electrically connected to a contact hole (not illustrated) opened in the gate insulating film 21. As described above, this disclosure can be applied to the liquid crystal display device of the FFS mode, and the same effects can be achieved.

Second Embodiment

In the display region 101 of the first embodiment, a new second common wiring (not illustrated) is individually provided on the same layer as the scan wirings 104, and the common wiring 105 and the second common wiring on the capacitor insulating film 27 are electrically connected through a contact hole (not illustrated) opened in the insulating film. In this structure, since the electrical resistance of the common wiring can be reduced, an effect where the display quality is improved is achieved. In addition, in this case, the lead-out wiring 111 may be formed by extending the second common wiring which is on the same layer as the scan wirings 104.

In a case where the lead-out wiring 111 is configured by directly leading out the common wiring 105, if the ground electrode 10 is provided at an upper portion thereof, the insulating film covering the common wiring 105 is further required only for it. However, in a case where the second common wiring or the lead-out wiring 111 continue to the second common wiring is formed on the same layer as the scan wirings 104, the ground electrode 10 or the conducting layer 13 can be provided on a upper layer than the wiring thereof, by covering the upper layer thereof with the first insulating layer. In addition, in a case where the second common wiring, the scan wirings 104, and the lead-out wiring 111 are formed on the same layer, manufacturing costs may be reduced because they are formed at the same time if above components are made of the same materials.

Further, as a modification example of the second embodiment, an embodiment, in which the second common wiring is provided on the same layer as the scan wirings 104 and the ground electrode is provided above the lead-out wiring 110, will be described. As described above, since the common wiring 105 and the second common wiring are electrically connected to each other, the contact hole is required to be opened in the capacitor insulating film 27, and also the opening portion 12 which exposes the ground electrode 10 on the lead-out wiring 110 may be provided on the third insulating layer 11 at the same time of being opened. After that, the conducting layer 13 may be provided at the same time of forming the common wiring 105. That is, the common wiring 105 and the conducting layer 13 share a film made of the same material with each other. According to this manufacturing method, a structure in the frame region 102 and a structure in the display region 101 can be formed at the same time, and thus an effect of high productivity can be achieved.

Third Embodiment

In the second embodiment, the second common wiring is formed on the same layer as the scan wirings, but a layer where the second common wiring is added is not limited to the same layer as the scan wirings 104, and may be stacked with the common wiring 105. Further, as another embodiment, in addition to the configuration of the embodiment illustrated in FIG. 4 and FIG. 5, the second common wiring, which is made of a metal layer, may be separately formed on the same layer as the pixel electrode. In this case, the second common wiring may be electrically connected to the common wiring on the capacitor insulating film through the contact hole. Even in the structure, since the electrical resistance of the common wiring can be reduced, an effect where the display quality is improved is achieved.

In addition, in a case where the second common wiring is formed of a metal film, if the second common wiring is formed to overlap with at least one of the scan wirings 104 or the signal wirings 103, an effect, of which opening ratio where light passes through the pixel portion is not decreased, is achieved. Further, since the upper layer of the metal film is covered with the capacitor insulating film, a possibility of corrosion can be also suppressed as compared a case where the second common wiring and the common wiring 105 are directly stacked.

In addition, when the second common wiring is formed of the metal film, the ground electrode, the conductive bus, and the FPC connecting electrode may be formed at the same time. That is, in the second embodiment, in addition to the pixel electrode, the second common wiring and the ground electrode are formed on the interlayer insulating film corresponding to the second insulating layer. At this time, the ground electrode is formed on the same layer and is formed of the same material as the second common wiring. Additionally, the ground electrode, the conductive bus, and the FPC connecting electrode can be formed with using the metal film, without adding a manufacturing process only for forming the ground electrode, and thus the electrical resistance can be reduced.

However, since the second common wiring is originally added in the second embodiment, at least one of a film forming process and a photolithography process is increased as compared with a manufacturing process of a structure according to the first embodiment. Here, it is preferable that manufacturing is performed without increasing the number processes of the photolithography process than the structure of the first embodiment. Specifically, after the transparent conductive film and the metal film are stacked on the interlayer insulating film corresponding to the second insulating layer, the pixel electrode made of the transparent conductive film, and the second common wiring, which is formed by stacking the transparent conductive film and the metal film, may be formed by using multiple exposure of well-known gray tone, half tone and the like. Even in this case, the ground electrode can be made of a layer including the metal film, and thus an effect where the electrical resistance can be reduced is achieved.

Figures 6, 7:
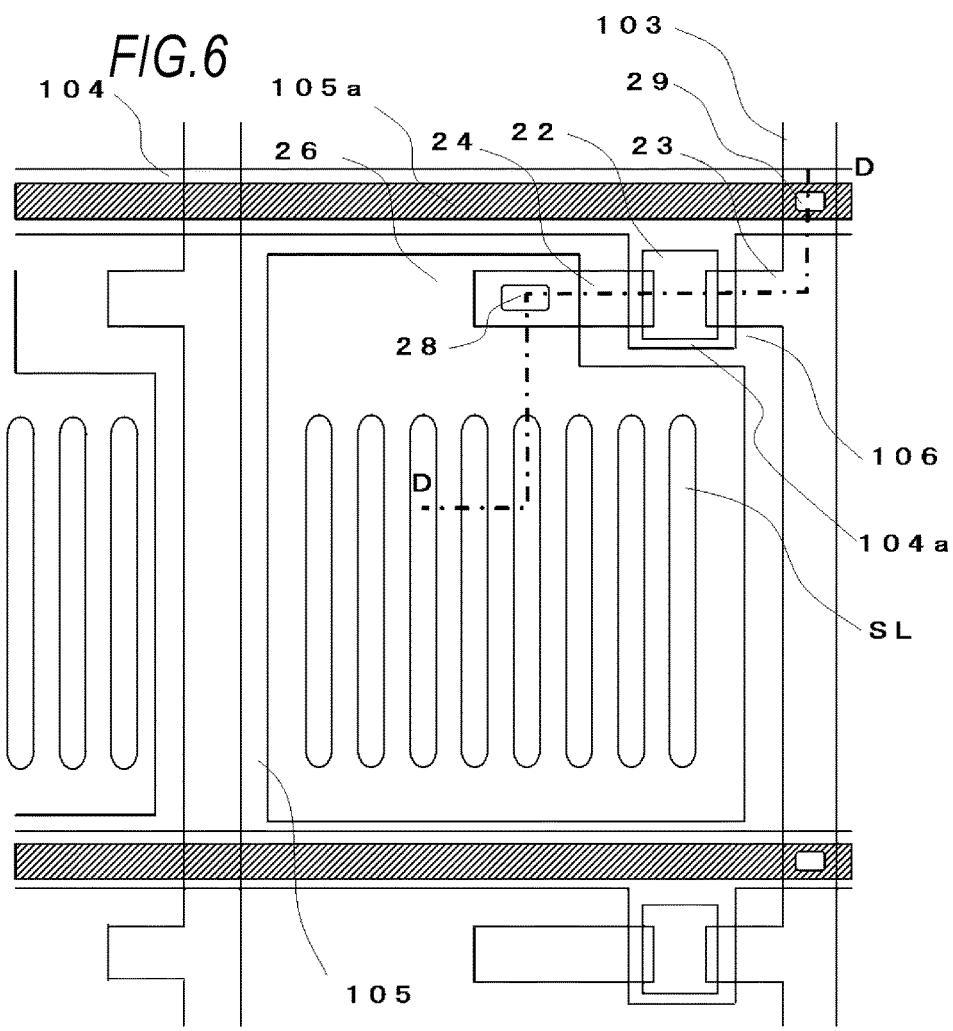
FIG. 6 is a plan view illustrating the display region of the liquid crystal display device according to a third embodiment of this disclosure.
FIG. 7 is a cross-sectional view taken along a line D-D of FIG. 6.

Configurations described above are illustrated in FIG. 6 and FIG. 7. FIG. 6 is a plan view illustrating the display region of the liquid crystal display device according to the third embodiment, and FIG. 7 is a cross-sectional view illustrating a part of D-D in FIG. 6 which is a plan view. Hereinafter, only differences of FIG. 4 and FIG. 5 are described. First, in order to easily recognize drawings, the common wiring 105 is illustrated widely on the entire surface in the display region 101 different from FIG. 4 or FIG. 5. In this configuration, the common wiring 105 can be referred to as the common electrode rather than the common wiring.

Next, the second common wiring 105a is added. The second common wiring 105a is formed on the interlayer insulating film 25 and is illustrated as a stack of a lower layer 105a1 and an upper layer 105a2. This structure is a structure where a manufacturing method using the multiple exposure described above is used. In this case, the lower layer 105a1 corresponds to the transparent conductive film, and the upper layer 105a2 corresponds to the metal film. The upper layer 105a2 may be formed by stacking the metal films. Meanwhile, in a case where the multiple exposure is not used, it does not matter that the second common wiring 105a is a single layer of the metal film.

The second common wiring 105a is formed to overlap with the scan wirings 104 in FIG. 6, but may be formed to overlap with the signal wirings 103. In addition, the second common wiring 105a may overlap with both the scan wirings 104 and the signal wirings 103. In this case, the second common wiring may be formed in a grid shape to correspond to pixels divided by the scan wirings and the signal wirings.

Further, the second common wiring 105a and the common wiring 105 are electrically connected to each other through a second contact hole 29 opened to the insulating film 27 between electrodes. Therefore, both the second common wiring 105a and the pixel electrode 26 are also formed on the interlayer insulating film 25, but these are not electrically connected to each other and patterns thereof are formed separately from each other. In addition, in the same manner as the modification example of the second embodiment, the opening portion 12 may be formed at the same time of opening the contact hole 29.

Also, the third embodiment is described under consideration of a transmissive type where the light is transmitted to the pixel portion and contributes display light. However, in a case of a reflecting type which reflects external light and contributes the display light, the pixel electrode is formed of a metal having a high reflection ratio of visible light, for example, silver, aluminum, or the like. Therefore, the transparent conductive film like the lower layer 105a1 is not necessarily formed.

Next, the frame region 102 will be described. The second common wiring is provided on the same layer as the pixel electrode in the third embodiment. The second common wiring may be used as the lead-out wiring 111 by directly extending in a direction of the frame region 102. In this case, since the lead-out wiring 111 extending from the second common wiring is formed through the lead-out wiring 111 extending from the scan wirings 104 and the insulating film, an effect where disconnection of both of them can be reduced is achieved.

However, in such a configuration described above, in a case where the ground electrode 10 is provided to overlap with the lead-out wiring 111 extending from the second common wiring, it is necessary that the ground electrode 10 is arranged so as not to be short-circuited with the lead-out wiring. Here, at the time where the scan wirings 104 is formed in advance, the lead-out wiring 111 extending from the second common wiring may be formed at the same time. That is, the second common wiring is formed on the interlayer insulating film 25 in the display region, and the lead-out wiring at the frame region may be formed on the same layer as the scan wirings 104 in the same manner as the second embodiment.

After that, although it is not illustrated, the contact hole exposing and opening each of the second common wiring 105a and the lead-out wiring 111 is provided on the insulating film, and then, electrical connection may be obtained by forming a conductive pattern which covers an exposed portion of each of them. The conductive pattern is formed without increasing the number of processes if it is formed at the same time of forming the common wiring 105.

Since the lead-out wiring 111 extending from the second common wiring is formed on the same layer as the lead-out wiring 111 continue into the scan wirings 104 as a layer, the ground electrode can be provided on the lead-out wiring 111 extending from the second common wiring. In addition, even if the lead-out wiring 111 is formed at the same time of forming the signal wirings 103, the ground electrode can be provided in the same manner.

Even in the third embodiment, as described in the first embodiment or the second embodiment, an effect capable of preventing of display defect due to charging and making the frame be narrow of the liquid crystal display device is achieved.

The liquid crystal display device can be manufactured by a well-known method using the TFT substrate 1 of the liquid crystal display panel 100 according to the first to third embodiments. For example, peripheral portions of the substrate are sealed with the seal 4 to seal the liquid LC between the TFT substrate and the CF substrate and thus liquid crystal display panel is formed. An external circuit including a driving circuit, and the like is connected to a terminal of the TFT substrate, each member is combined into a frame so that a back light, which is a planar light source device including LED, a light guiding plate, or the like, though an optical sheet is provided on a rear side of the liquid crystal display panel, and thus the liquid crystal display device can be manufactured.

What is claimed is:
1. A liquid crystal display device comprising:
a first substrate which includes a display region, in which scan wirings and signal wirings intersecting with scan wirings are formed, and a frame region, which surrounds the display region, wherein a lead-out wiring extending from at least one of the signal wiring and the scan wiring and a ground electrode on an insulating layer covering the lead-out wiring are formed in the frame region;
a second substrate, which faces and is bonded to the first substrate with interposing a seal, wherein a transparent conductive film is formed on a surface opposite to a side where the liquid crystal is provided; and
a conductive member, which is formed to extend across the first substrate and the second substrate to electrically connect the transparent conductive film with the ground electrode,
wherein the ground electrode overlaps with at least one of the lead-out wirings.
2. The liquid crystal display device according to claim 1, wherein the liquid crystal display device uses a transverse electric field.
3. The liquid crystal display device according to claim 2, wherein the ground electrode is provided in a lead-out wiring region.
4. The liquid crystal display device according to claim 2, wherein, the display region is provided with a switching element connected to at least one of the scan wirings and the signal wirings, a pixel electrode connected to the switching element, and a common wiring, and
wherein liquid crystal molecules of the liquid crystal are driven in response to an electric field generated between the pixel electrode and the common wiring.
5. The liquid crystal display device according to claim 2, wherein the pixel electrode is electrically connected to the switching element through a contact hole opened in the interlayer insulating film,
wherein the a second common wiring, which includes a metal film and is formed on a same layer as the pixel electrode, is provided in the display region, and
wherein the ground electrode provided above the lead-out wiring extending from the signal wirings is formed on a same layer as the second common wiring and is formed of a same material as the second common wiring.
6. The liquid crystal display device according to claim 1, wherein a plurality of the ground electrodes are formed.
7. The liquid crystal display device according to claim 1, further comprising:
a conducting layer, which is connected to the ground electrode through an opening portion opened in the insulating film covering the ground electrode, wherein the conductive member covers the conducting layer.
8. The liquid crystal display device according to claim 7, wherein the conducting layer protrudes from a planar contour of the ground electrode.
9. The liquid crystal display device according to claim 1, wherein a conductive material is one of a conductive paste and a conductive tape.

* * * * *